United States Patent Office 3,165,546
Patented Jan. 12, 1965

3,165,546
DIARYL PEROXIDES BY REACTION OF HYPO-
CHLORITES ON CORRESPONDING HYDRO-
PEROXIDES
Stewart H. Merrill, Rochester, N.Y., assignor to Eastman
Kodak Company, Rochester, N.Y., a corporation of
New Jersey
No Drawing. Filed Sept. 27, 1962, Ser. No. 226,752
10 Claims. (Cl. 260—502)

This invention relates to diaryl peroxides and to a process for their preparation.

It is known that organic peroxides have considerable utility as initiators of vinyl polymerizations and other radical reactions. Various methods have been proposed for the preparation of di-organo peroxides from the corresponding organo hydroperoxides. For example, M. S. Kharasch et. al., J. Org. Chem., 15, 753 (1950), have described a number of thermal reactions for converting cumene hydroperoxide to dicumyl peroxide. Other reported methods for carrying out this conversion include a catalyzed aerial oxidation of cumene requiring several days, and an acid-catalyzed reaction of cumene hydroperoxide and cumyl alcohol. However, these prior art methods have serious short-comings having poor yields and being difficult of operation and often involving hazardous spontaneous decomposition of the products. Furthermore, they are not applicable for some diorgano peroxide preparations. I have now discovered an entirely new and highly efficient method for converting certain aryl hydroperoxides to the corresponding diaryl peroxides.

It is an object of the invention, therefore, to provide a novel process for the preparation of diaryl peroxides from aryl hydroperoxides. Another object is to provide polymeric materials prepared with such diaryl peroxides. Other objects will become apparent from the description and examples.

In accordance with the invention, I prepare the diaryl peroxides of the invention by a process which comprises treating aryl hydroperoxides of the general formula:

(I) 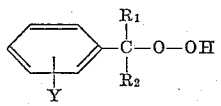

wherein each $R_1$ and $R_2$ is the same or different alkyl groups of from 1 to 4 carbon atoms, e.g., methyl, ethyl, propyl, isopropyl, n-butyl, etc., groups wherein $R_1$ and $R_2$ together complete a cyclohexane ring, and wherein Y represents hydrogen, a halogen such as chlorine or bromine, an alkyl group of from 1 to 4 carbon atoms, an —$NO_2$ group, a —COOH, and a —$COOR_3$ wherein $R_3$ represents an alkali or alkaline earth metal atom such as sodium, potassium, calcium, etc., with an alkali or alkaline earth metal hypochlorite such as sodium, potassium, or calcium hypochlorite, in an aqueous caustic alkali solution at a temperature of about from 0 to 100° C., to give peroxide products represented by the following general formula:

(II 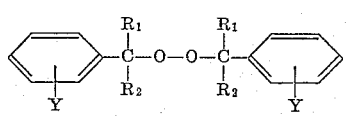

wherein $R_1$, $R_2$ and Y are as above defined. The diaryl peroxides thus obtained may be separated from the reaction mixtures by conventional separation means such as solvent extraction, evaporation, crystallization, etc. The amount of the hypochlorite used can vary from as little as 0.3 to 1.5, or more, molar equivalents, but preferably at least 0.5 mole of the hypochlorite reagent per mole of the starting hydroperoxide. The diaryl peroxides of above structure II wherein Y represents the group —COOH or alkali metal salt thereof are particularly useful for the preparation of other compounds. For example, when treated with phosphorus pentachloride, the corresponding peroxide acid chlorides are obtained, which in turn may be readily converted to the corresponding dialkyl esters by esterification with appropriate alcohols and wherein the alkyl group may contain from 1–12 carbon atoms, e.g., methyl, ethyl, propyl, isopropyl, n-butyl, n-hexyl, n-decyl, n-dodecyl, etc. groups. These esters are vulcanizing agents for rubber.

The intermediate aryl hydroperoxides represented by the above structure I may be prepared as described, for example, by E. J. Lorandt et al., in U.S. Patent No. 2,691,-683, dated October 12, 1954, and by M. A. Taves, in U.S. Patent No. 2,829,156, dated April 1, 1958.

The following examples further illustrate the invention.

*Example 1.—p-Carboxy-α,α-Dimethylbenzyl Hydroperoxide*

This example illustrates the preparation of a particular intermediate hydroperoxide employed in the process of the invention.

25 grams of p-isopropylbenzene were dissolved in a solution of 10 grams of potassium hydroxide in 100 ml. of water. The pH was adjusted to 9–10 with dilute hydrochloric acid, and 0.5 g. of cumene hydroperoxide was added. The solution was placed in a 65° C. bath under a reflux condenser and oxygen was bubbled in slowly for 48 hours. An additional 0.3 g. of the hydroperoxide was added, and the oxidation was continued for another 24 hours. The cooled solution was acidified and chilled. The solid which formed was collected and washed with ice water. The dried mixture of acids obtained was treated with 100 ml. of warm benzene to extract the unreacted isopropylbenzoic acid. After cooling, the crude hydroperoxide product was collected, recrystallized twice from 300-ml. portions of benzene and once from 50 ml. of water (filtered while hot). The yield was 4.2 g., M.P. 147–149° C. (152–154° C. when placed in preheated 150° C. bath).

Analysis of the above product showed that it contained 61.0% by weight of carbon and 5.9% by weight of hydrogen as compared to the calculated theory for $C_{10}H_{12}O_4$ of 61.2% of carbon and 6.2% of hydrogen. When the product was refluxed in 15% sulfuric acid for 3 hours, the product decomposed into acetone which was identified by its dinitrophenylhydrazone, and p-hydroxybenzoic acid which was identified by its melting point. To 0.154 g. of the hydroperoxide were added 15 ml. of water, 1.5 g. of potassium iodide, 8 ml. of 4 N sulfuric acid and 5 ml. of ethanol. The flask was flushed with nitrogen, stoppered with a cotton wad and heated at 70° C. for 40 minutes. The liberated iodine was titrated with 0.10 N sodium thiosulfate. The peroxide equivalent was 198 compared with the calculated value of 196. Accordingly, these results indicate that substantially pure p-carboxy-α,α-dimethylbenzyl hydroperoxide had been obtained.

*Example 2.—Bis(p-Carboxy-α,α-Dimethylbenzyl) Peroxide*

A solution of the potassium salt of p-isopropylbenzoic acid was oxidized to the p-carboxy-α,α-dimethylbenzyl hydroperoxide in accordance with the procedure of Example 1, except that the temperature was raised to 80° C. and a period of 22 hours was adequate. To the alkaline solution at 25° C. was added 1.3 M potassium hypochlorite solution in small portions, until the evolution of oxygen ceased. About 20 ml. of the solution were used. The acid which was recovered after acidification was added to 300 ml. of boiling 2:1 ethanol-water. The resulting milky mixture was set aside to cool. The insoluble peroxide which settled out was collected and recrystallized twice by dissolving in 400 ml. of boiling ethanol and adding water to incipient crystallization at the boiling point. Each crystallization required a day for completion. The yield was 3.3 g., M.P. 209–211° C.

Analysis of the above product showed it to contain by weight 67.3% of carbon and 6.2% hydrogen, M.W. about 376±30 and a neutralization equivalent of 184, as compared to the calculated theory for $C_{20}H_{22}O_6$ of 67.0% of carbon and 6.2% of hydrogen and molecular weight of 358 and a Neut. (neutralization) equivalent of 184. The heaviest ion found by introduction of this compound into the mass spectrometer (inlet temperature, 235° C.) was mass 179, corresponding to cleavage of the O—O bond of the peroxide. The gaseous product from the thermal decomposition was identified by the mass spectrometer as methane. The solid residue was principally p-acetylbenzoic acid, identified by mixed melting point. The product also liberated iodine from a mixture of equal volumes of acetic acid and 47% hydroiodic acid when heated at 75° C. for two hours in a nitrogen atmosphere. These results clearly established that the product obtained was substantially pure bis(p-carboxy-α,α-dimethylbenzyl)peroxide having the structure:

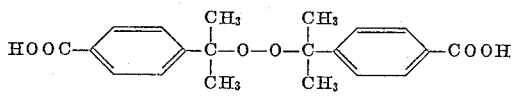

The above compound and related compounds of the invention of the general formula:

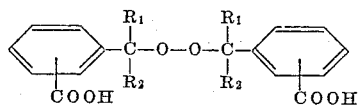

wherein $R_1$ and $R_2$ are as previously defined, all have relatively high thermal stabilities. For this reason, these peroxides are not likely to find use as thermally-decomposed polymerization initiators, but they have other uses. For example, they can function as photo-initiators of polymerization, the initiator fragment with a carboxyl group being attached to the polymer chain. The above peroxides can also serve as components in polyamides and polyesters as illustrated hereinafter. These polymers on irradiation or heating to an elevated temperature decompose into small fragments with the evolution of a gas. This provides a basis of photographic or thermographic reproduction processes. Also, when incorporated as a minor component in a polyester or polyamide and irradiated in the presence of a vinyl monomer or other monoethylenically unsaturated, polymerizable monomer containing a $CH_2$=CH— group or a $CH_2$=C< group, such as a vinyl carboxylic ester represented by vinyl acetate, vinyl propionate, etc., acrylamide, methacrylamide, acrylonitrile, methacrylonitrile, vinyl chloride, vinylidene chloride, methyl acrylate, methyl methacrylate, styrene, etc., cleavage occurs at the peroxide group forming radicals which initiated their polymerizations. Block copolymers of various types can be made in this way.

*Example 3.—Bis(p-Chlorocarbonyl-α,α-Dimethylbenzyl)Peroxide*

To 5.5 g. of the peroxide of above Example 2 suspended in 25 ml. of dioxane were added 6.5 g. of phosphorus pentachloride. Mixing and gentle heating gave a solution which was allowed to stand 30 minutes. The Mixture, which now contained some crystals, was evaporated to near dryness under vacuum. The residue obtained was slurried in ether, recovered by filtration and washed with ether. Recrystallization from 30 ml. of benzene and filtered hot gave 4.7 g. of white needles, M.P. 146–147° C.

Analysis of the above product showed that it contained 18.5% by weight of chlorine as compared with calculated theory for $C_{20}H_{20}Cl_2$ of 18.0% by weight of chlorine. This indicated that the product was the acid chloride of the bis(p-carboxy-α,α-dimethylbenzyl)peroxide of Example 2. The dimethyl ester prepared with this acid chloride had a melting point of 166° C. with decomposition, while the diisobutyl ester had a melting point of 64–67° C.

*Example 4.—Polyamide of Bis(p-Carboxy-α,α-Dimethylbenzyl)-Peroxide and Piperazine*

To 2.2 g. (0.11 mole) of piperazine hydrate in 60 ml. of 5 percent potassium carbonate were added with vigorous stirring 4.7 g. (0.011 mole) of the peroxide acid chloride from above Example 3 in 30 ml. of methylene chloride. Within a few minutes polymer separated. It was recovered by filtration, washed with water and dried. The product melted with some foaming at 200° C. It was soluble in m-cresol, formic acid and benzyl alcohol from which solutions it was coatable into flexible sheets which were photosensitive. Analysis for nitrogen gave 7.0% by weight as compared with the calculated theory for the divalent repeating unit $C_{24}H_{28}N_2O_4$ of 6.9% by weight of nitrogen.

*Example 5.—Polyester of Bis(p-Carboxy-α,α-Dimethylbenzyl)-Peroxide and 2,2 - Bis(4 - Hydroxyphenyl)-Propane*

2.2 g. (0.4096 mole) of bisphenol were dissolved in 20 ml. of water containing 2.0 g. (0.05 mole) of sodium hydroxide. A solution of 3.9 g. (0.0099 mole) of the acid chloride of above Example 3 in 30 ml. of methylene chloride was added with vigorous stirring. After 30 minutes, no further increase in viscosity was noted. The mixture was then acidified with acetic acid, the phases were separated, and the organic layer was washed with three portions of water. A low molecular weight polymer was obtained by precipitation in methanol. It softened at 75° C., and gas was evolved from the melt at 160° C. Analysis of this product gave 74.9% by weight of carbon and 6.1% by weight of hydrogen as compared for the calculated theory for the divalent repeating unit $C_{35}H_{34}O_6$ of 76.4% of carbon and 6.2% of hydrogen. It formed continuous photo-sensitive films on coating from its solutions.

*Example 6.—Methoxymethylated Copolyamide of Adipic Acid, Peroxide Acid Chloride and 1,6-Hexanediamine*

A polyamide was made from 11.5 g. (0.0625 mole) of adipyl chloride, 1.0 g. (0.0025 mole) of the peroxide acid chloride of above Example 3 and 7.8 g. (0.067 mole) 1,6-hexanediamine by the procedure of above Example 4. The copolyamide obtained was methoxymethylated in formic acid by the method of Cairns et al., J. Am. Chem. Soc., 71, 651 (1949). The product was soluble in 80% ethanol and had a nitrogen content of 9.5%.

*Example 7.—Block Copolymer of Methoxymethylated Polyamide and Acrylamide*

A methanol (25 ml.) solution of 1.2 g. of the methoxymethylated copolyamide of above Example 6 and 2.0 g. of acrylamide was sealed under nitrogen and exposed for one hour to the radiation of a medium pressure mercury vapor lamp. After a reduction in volume, the solution was poured into water to precipitate the product and dissolve any acrylamide homopolymer. The nitrogen content of the block copolymer obtained was 10.5% by weight, indicating a content of approximately 10% by weight of acrylamide, on the basis of a nitrogen content of 9.5% for the starting copolyamide.

*Example 8.—Block Copolymer of Methoxymethylated Polyamide and Methyl Methacrylate*

A solution of 3.0 g. of the methoxymethylated copolyamide of above Example 6 and 2.0 of methyl methacrylate in 10 ml. of methanol was irradiated as in above Example 7. The product was precipitated in cyclohexane and extracted for several hours with warm benzene to remove any methyl methacrylate homopolymer. The block copolymer obtained was soluble in a mixture of equal volumes methanol and chloroform, and in hot 80% ethanol. It was insoluble in methanol and in cold 80% ethanol. A nitrogen content of 7.7% by weight was found which corresponds to a methyl methacrylate content of about 19% by weight.

*Example 9.—Preparation of Dicumyl Peroxide*

100 ml. of a 5% sodium hypochlorite solution was added dropwise over a 20-minute period to a vigorously stirred mixture of 5 g. of sodium hydroxide and 20 g. of commercial cumene hydroperoxide (77 percent) in 50 ml. of water. The temperature was maintained at 20–30° C. A few minutes after the addition was completed, the mixture was extracted with ether. The organic solution was washed with water, dried and the volatiles removed by distillation to a maximum pot temperautre of 95° C. at 0.2 mm. pressure. The oily residue was dissolved in an equal volume of pentane and chilled to —20° C. to crystallize. The white solid was dissolved in 13 ml. of methanol, a little water was added to initiate crystallization, and crystallization was completed at 5° C. The yield of dicumyl peroxide was 3.5 g., M.P. 39.5–40.5° C.

The intermediate aryl hydroperoxides of structure I wherein Y is carboxyl group or alkali metal salt thereof are also capable of entering into polymer formations, wherein the hydroperoxide is attached through its carboxyl group to a polymer chain. These are illustrated by the following Examples 10 to 12.

*Example 10.—Hydroperoxide Attached to Polyvinyl Alcohol*

A solution of 10 g. of vinyl acetate, 0.25 g. of N-vinyl-t-butylurethane and 0.1 g. of azobisisobutyronitrile in 30 ml. of methanol was sealed under nitrogen and heated at 60° C. for 4 days. After dilution with methanol, the solution was poured into methanol to precipitate the copolymer.

To 8 g. of this copolymer in 35 ml. of methanol were added 10 ml. of 50% sulfuric acid. During a period of 2.5 hours at 60° C., the hydrolyzed copolymer separated. It was washed well with methanol, dissolved in water, filtered, and reprecipitated in methanol. Titration with standard hydrochloric acid indicated an amine equivalent weight of 3600.

A solution of 1.4 g. of this hydrolyzed copolymer and 0.12 g. (0.6×10⁻³ mole) of p-carboxy-α,α-dimethylbenzyl hydroperoxide in 10 ml. of warm water was made. To this was added 0.15 g. (0.6×10⁻³ mole) of dicyclohexylcarbodiimide in 10 ml. of dimethylformamide. The mixture was allowed to stand at room temperature for 3 days, after which it was diluted with an equal volume of warm water, filtered and poured into isopropyl alcohol to precipitate the polymeric product. Titration of this product gave an amine equivalent weight of 13,700. About 75% of the amine groups had been converted to amide groups. A copolymer of styrene and m-aminostyrene can be used in place of vinyl acetatevinylamine copolymer in the above procedure to give a corresponding similar product.

*Example 11.—Polyvinyl Alcohol Grafted With Acrylonitrile*

In 15 ml. of water were dissolved 0.3 g. of the polyvinyl alcohol containing hydroperoxide groups from above Example 10 and 0.5 g. of acrylonitrile. The flask was flushed with nitrogen, and a few drops of 10% ferrous sulfate solution were added. After one hour, the slightly cloudy mixture was poured into isopropyl alcohol to precipitate the polymeric product. A nitrogen content of 8.4% by weight indicated that this product contained 32% by weight of acrylonitrile. It produced cloudy solutions in water. However, it was soluble in dimethylformamide and gave continuous films when coated that had good affinity for various dyes.

*Example 12.—Polyvinyl Alcohol Grafted With Acrylamide*

A solution of 0.7 g. of the polyvinyl alcohol prepared according to above Example 10 and 2 g. of acrylamide in 8 ml. of water, in a nitrogen atmosphere, was treated with a few drops of ferrous sulfate solution. Immediately the mixture became warm and more viscous. After dilution with water, it was poured into isopropyl alcohol to precipitate the polymeric product. An acrylamide content of 57% by weight was shown by a composition of 11.1% by weight of nitrogen.

*Example 13.—Carboxy-Terminated Polyacrylamide*

A solution was made of 0.4 g. of p-carboxy-α,α-dimethylbenzyl hydroperoxide in warm water. Then 12 g. of acrylamide were added, followed by 0.5 g. of ferrous sulfate in 10 ml. of water. After the polymerization was complete, the solution was treated with potassium carbonate solution and filtered to remove the ferric hydroxide which precipitated. The filtrate was acidified with hydrochloric acid and poured into methanol to precipitate the polymer. Titration with standard alkali solution indicated that the polymer had an equivalent molecular weight of 10,400. The carboxy termination makes this polymer suitable for preparing various graft or block polymers.

The invention has been described in detail with particular reference to preferred embodiments thereof, but it will be understood that variations and modifications can be effected within the spirit and scope of the invention as described hereinbefore and as defined in the appended claims.

What I claim is:

1. A process comprising reacting an aryl hydroperoxide of the general formula:

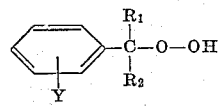

wherein $R_1$ and $R_2$ represent a member selected from the group consisting of alkyl groups of from 1–4 carbon atoms and the element required to complete a cyclohexane ring, and Y represents a member selected from the group consisting of hydrogen, halogen, alkyl groups of 1–4 carbon atoms, the —NO₂ group and the —COOH group, with a metal hypochlorite selected from the group consisting of alkali metal hypochlorites and alkaline earth hypochlorites, in aqueous caustic alkali at a temperature of from 0–100° C. to form a corresponding diaryl peroxide.

2. A process for preparing a bis(p-carboxy-α,α-dialkylbenzyl)peroxide which comprises reacting a p-carboxy-α,α-dialkylbenzyl hydroperoxide with an alkali metal hypochlorite, in aqueous caustic alkali at a temperature of from 0–100° C.

3. A process for preparing bis(p-carboxy-α,α-dimethylbenzyl)peroxide which comprises reacting p-carboxy-α,α-dimethylbenzyl hydroperoxide with an alkali metal hypochlorite, in aqueous caustic alkali at a temperature of from 0–100° C.

4. A process for preparing dicumyl peroxide which comprises reacting cumene hydroperoxide with an alkali metal hypochlorite, in aqueous caustic alkali at a temperature of from 0–100° C.

5. The process according to claim 2 wherein the said bis(p-carboxy-α,α-dialkylbenzyl)peroxide is subsequently reacted with phosphorus pentachloride to form the corresponding peroxide acid chloride.

6. The process according to claim 3 wherein the said bis(p-carboxy-α-α-dimethylbenzyl)peroxide is subsequently reacted with phosphorus pentachloride to form the corresponding bis(p-chlorocarbonyl-α,α-dimethylbenzyl)peroxide.

7. A peroxide compound selected from the group consisting of a bis(p-carboxy-α,α-dialkylbenzyl)peroxide wherein the alkyl portion contains from 1–4 carbon atoms, an alkali metal salt thereof, and an acid chloride thereof.

8. Bis(p-carboxy-α,α-dimethylbenzyl)peroxide.

9. Sodium salt of bis(p-carboxy-α,α-dimethylbenzyl)peroxide.

10. Bis(p-chlorocarbonyl-α,α-dimethylbenzyl)peroxide.

References Cited in the file of this patent

UNITED STATES PATENTS 2,938,012 Filar _____ May 24, 1960

FOREIGN PATENTS 843,617 Great Britain _____ Aug. 4, 1960

OTHER REFERENCES

Hawkins: Organic Peroxides, 1961, pp. 219–221, QD 305 H1H38.

UNITED STATES PATENT OFFICE
CERTIFICATE OF CORRECTION

Patent No. 3,165,546　　　　　　　　　　　　　　　January 12, 1965

Stewart H. Merrill

It is hereby certified that error appears in the above numbered patent requiring correction and that the said Letters Patent should read as corrected below.

Column 6, line 46, for "element" read -- elements --.

Signed and sealed this 22nd day of June 1965.

(SEAL)
Attest:

ERNEST W. SWIDER
Attesting Officer

EDWARD J. BRENNER
Commissioner of Patents